US008882908B2

(12) United States Patent
Fenelon

(10) Patent No.: US 8,882,908 B2
(45) Date of Patent: Nov. 11, 2014

(54) REVERTING COLORED CONCRETE AND RINSE WATER TO GRAY

(71) Applicant: Terrance P. Fenelon, Mendota Heights, MN (US)

(72) Inventor: Terrance P. Fenelon, Mendota Heights, MN (US)

( * ) Notice: Subject to any disclaimer, the term of this patent is extended or adjusted under 35 U.S.C. 154(b) by 0 days.

(21) Appl. No.: 13/758,360

(22) Filed: Feb. 4, 2013

(65) Prior Publication Data

US 2013/0139730 A1 Jun. 6, 2013

Related U.S. Application Data

(62) Division of application No. 12/764,285, filed on Apr. 21, 2010, now abandoned.

(60) Provisional application No. 61/245,343, filed on Sep. 24, 2009.

(51) Int. Cl.
| | |
|---|---|
| *C04B 22/00* | (2006.01) |
| *C04B 40/00* | (2006.01) |
| C04B 111/80 | (2006.01) |
| C04B 111/00 | (2006.01) |

(52) U.S. Cl.
CPC ............. *C04B 22/00* (2013.01); *C04B 2111/80* (2013.01); *C04B 2111/0075* (2013.01); *C04B 40/0039* (2013.01)
USPC .......................................... 106/741; 700/265

(58) Field of Classification Search
USPC .......................................... 106/741; 700/265
See application file for complete search history.

(56) References Cited

U.S. PATENT DOCUMENTS

| | | | | |
|---|---|---|---|---|
| 3,102,039 | A | | 8/1963 | Manecke |
| 4,946,505 | A | | 8/1990 | Jungk |
| 5,484,481 | A | | 1/1996 | Linde et al. |
| 5,723,517 | A | * | 3/1998 | Campo et al. ................. 523/303 |
| 5,725,655 | A | * | 3/1998 | Catterton et al. ............. 106/738 |
| 5,987,831 | A | * | 11/1999 | Lamberts-Van Assche .... 52/316 |
| 5,993,536 | A | * | 11/1999 | Matsui et al. ................. 106/712 |
| 6,224,250 | B1 | * | 5/2001 | Kreinheder et al. .............. 366/8 |
| 6,402,831 | B1 | * | 6/2002 | Sawara et al. ................. 106/738 |
| 6,682,655 | B2 | * | 1/2004 | Beckham et al. ............. 210/740 |
| 7,050,886 | B2 | * | 5/2006 | Oberg et al. ................. 700/282 |
| 7,736,432 | B2 | * | 6/2010 | Buesing et al. ............... 106/713 |
| 2003/0158617 | A1 | * | 8/2003 | Turpin et al. .................... 700/97 |
| 2007/0266905 | A1 | * | 11/2007 | Amey et al. ................... 106/802 |
| 2008/0011775 | A1 | * | 1/2008 | Arisman ........................... 222/1 |

\* cited by examiner

*Primary Examiner* — Paul Marcantoni
(74) *Attorney, Agent, or Firm* — HolzerIPLaw, PC

(57) ABSTRACT

A simple and easily useable system for reverting an uncured colored concrete material back to a gray color, by merely determining the original pigment and loading initially used to color the concrete material. The system utilizes a collection of pigment mixtures that can be selected and combined as needed to revert virtually any colored concrete back to a gray color, thus eliminating or reducing the expulsion of non-gray or colored concrete and/or dirty rinse water. Additionally, the volume of rinse water needed to clean out gray concrete is significantly less than that needed to clean out colored concrete.

15 Claims, 6 Drawing Sheets

REVERTING COLORED CONCRETE AND RINSE WATER TO GRAY

CROSS REFERENCE TO RELATED APPLICATIONS

This application is a divisional application of U.S. application Ser. No. 12/764,285 filed Apr. 21, 2010, which claims the benefit of U.S. Provisional application No. 61/245,343 filed Sep. 24, 2009 entitled "Method of Reverting Colored Concrete", the entire disclosures of which are incorporated herein.

FIELD OF THE INVENTION

This invention generally relates to methods and compositions for producing a desired color change in cementitious materials. Specifically, this invention relates to methods and compositions for producing a color change back to a gray color for colored cementitious products and for rinse water from colored cementitious materials.

BACKGROUND OF THE INVENTION

Colored concrete or other cementitious products are popular for many uses, such as walkways, patios and retaining walls for both residential and commercial uses, and also precast items such as blocks, pavers, roof tiles, colored mortar, and wall structures for commercial buildings. In some applications, the color is applied to the cementitious product as a dry powder or pigment onto the wet cement. In other applications, pigment (either as a dry powder or a liquid) is added to the cement mixture as it is being mixed with water, aggregate, etc. in a vessel, such as a portable cement mixer or a ready-mixed concrete truck.

The resulting colored material is deposited in the desired location (i.e., job site or factory) from the mixing vessel. A portion of the material, however, remains attached to the vanes, fins or other inside surface of the vessel. This colored residue must be removed from the inside of the vessel before a subsequent batch of concrete can be made, as any colored reside will partially color the subsequent batch, resulting in an off-color product. Typically, the colored residue is removed by hand scraping and then rinsed out with large volumes of water. The more solid colored residue (e.g., the initial removal of the colored material from the vessel) may be dumped and left to harden. The colored rinse water, however, must be disposed in an environmentally safe manner, which generally is by collection in licensed water collection pits. Care must be taken that essentially all color is removed from the vessel; such as rinse process often uses 300 or more gallons of rinse water.

The present disclosure provides systems, methods and compositions that are a benefit to the environment, by reducing the amount of clean rinse water needed to clean the vessel and by reducing the amount of dirty rinse water resulting from rinsing colored concrete. Additionally, the disclosure provides systems, methods and compositions that reduce the time needed to load a subsequent concrete batch in a vessel, resulting in cost savings.

BRIEF SUMMARY OF THE INVENTION

This invention provides a practical and 'green' alternative to disposing of colored concrete and colored concrete residue and rinse water by reverting the colored material back to an acceptable gray-like or gray color. Reverting colored concrete back to gray or acceptable gray-like allows the reverted concrete residue to be rinsed from the vessel with significantly less rinse water than needed to rinse colored residue from the vessel, which reduces clean water usage, reduces dirty water disposal and reduces operator time. Additionally, reverting colored concrete back to gray in the vessel allows a subsequent batch of new (gray) concrete to be loaded into the same, unrinsed vessel. Similarly, reverting colored concrete back to a gray-like or other acceptable color in the vessel allows a subsequent batch of new colored concrete to be loaded into the same, unrinsed vessel. The invention allows the cementitious product to be recycled and returned to the production stream rather than being discarded, for example, into a landfill or onto the ground. Additionally, the need for rinse water to remove colored reside from the vessel is eliminated, again reducing clean water usage, eliminating or reducing dirty water disposal, and reducing operator time.

This invention also provides a simple and easily useable system for reverting a colored material back to a gray color, by merely knowing the original pigment and loading initially used to color the material. The system of this invention utilizes a collection of pigment mixtures, formulated so that a single pigment mixture can revert numerous colored cement products back to their original gray color either in preparation for a subsequent concrete batch or for optimized discarding. The collection of reversion pigment mixtures allows a small number of reversion pigment mixtures (e.g., 10 mixtures, 8 mixtures, 7 mixtures, 6 mixtures) to return thousands of colors back to gray. The system also includes an information retention system that includes the cross-citation of the pigments in the original concrete color and of the reversion pigment mixture. By knowing the pigment and loading initially used to color the colored concrete, the appropriate reversion pigment mixture can be selected. The system and procedures of this invention are commercially viable, eliminating the need for a different reversion pigment mixture for every unique concrete color or a group of unique colors, and providing easy and quick reversion pigment mixture selection.

This invention provides a straightforward and practical system, that when implemented as designed, eliminates or reduces the expulsion of non-gray or colored concrete and/or dirty rinse water into the environment. For embodiments where a subsequent batch is mixed, this invention returns the previously colored concrete material to the productive product stream.

A first particular embodiment of this invention is a method for reverting uncured, colored concrete in a vessel to gray, the uncured colored concrete comprising gray concrete and pigment. The method includes determining a pigment formulation and loading that corresponds to the pigment, the pigment formulation having an amount of red pigment, an amount of black pigment, an amount of yellow pigment, and an amount of green pigment. To the colored concrete in the vessel is added a reversion pigment mixture. The reversion pigment mixture is selected based on at least one of a red pigment threshold and the amount of red pigment in the pigment formulation, a black pigment threshold and the amount of black pigment in the pigment formulation, a yellow pigment threshold and the amount of yellow pigment in the pigment formulation, and a green pigment threshold and the amount of green pigment in the pigment formulation. In some embodiments, the reversion pigment mixture is selected based on at least two of the pigments listed above, and in other embodiments, the reversion pigment mixture is selected based on the amount of red pigment, black pigment and yellow pigment in the pigment formulation.

If the original pigment formulation is known, the reversion pigment mixture can be determined from a database or other information retention system. If the original pigment formulation is not readily known, the reversions pigment mixture can be determined or estimated by merely looking at the colored concrete (i.e., visual inspection) or comparing the colored concrete color to a previous sample.

In some methods, the red pigment threshold is 15-25 wt-% of the pigment, or 17-20 wt-% of the pigment. Additionally or alternatively, in some methods, the black pigment threshold is 15-30 wt-% of the pigment, or 17-20 wt-% of the pigment. Further additionally or alternatively, in some methods, the yellow pigment threshold is 20-50 wt-% of the pigment, or 30-40 wt-% of the pigment. A threshold for both blue and green is 10-20 wt-%, or 12-18 wt-% of the original pigment.

A second particular embodiment of this invention is a method for reverting uncured colored concrete gray. The method includes determining a pigment formulation and loading in an uncured colored concrete in a vessel, the pigment formulation having an amount of red pigment, an amount of black pigment, an amount of yellow pigment, and an amount of green pigment, and adding a reversion pigment mixture to the colored concrete in the vessel, the reversion pigment mixture selected based on at least one of the amount of red pigment, the amount of black pigment, the amount of yellow pigment, and the amount of green pigment. After adding the reversion pigment mixture in the vessel, gray rinse water is dumped from the vessel.

The reversion pigment mixture may be selected based on at least one of a red pigment threshold and the amount of red pigment, a black pigment threshold and the amount of black pigment, a yellow pigment threshold and the amount of yellow pigment, and a green pigment threshold and the amount of green pigment. In some embodiments, the reversion pigment mixture is selected base on at least two of those. If the original pigment formulation is known, the reversion pigment mixture can be determined from a database or other information retention system. If the original pigment formulation is not readily known, the reversions pigment mixture can be determined or estimated by merely looking at the colored concrete (i.e., visual inspection) or comparing the colored concrete color to a previous sample.

A third particular embodiment of this invention is a gray concrete formed by, determining a pigment formula and loading of an uncured colored concrete, choosing a reversion pigment mixture based on the pigment formula and loading, and coloring the uncured colored concrete gray by adding the reversion pigment mixture to the uncured colored concrete. In some embodiments, the original pigment formula and loading is determined from an information storage source, such as a database, table, spreadsheet, or computer program. In other embodiments, the original pigment formula and loading is determined by visual evaluation.

A fourth particular embodiment of this invention is a kit for reverting uncured colored concrete comprising concrete and a pigment. The kit includes a first reversion pigment mixture having a first weight, and a second reversion pigment mixture having a second weight that is 1.5× or 2× or 3× or 4× the first weight. Both the first reversion pigment mixture and the second reversion pigment mixture are the same and include synthetic iron oxide pigment and/or organic pigment, titanium dioxide, and calcium carbonate and/or white Portland cement.

A fifth particular embodiment of this invention is a system that includes an information storage source that contains pigment formulas and loadings for a plurality of colored concretes and that contains data for corresponding reversion pigment mixtures for reverting each of the colored concretes to gray. The system also includes a kit having a first reversion pigment mixture and a second reversion pigment mixture.

Other embodiments of this invention are to a solid pigment mixture and a liquid pigment mixture for reverting uncured colored concrete to gray. A solid reversion pigment mixture may comprise a pigment (i.e., synthetic iron oxide pigment and/or organic pigment), titanium dioxide, and dispersion aid comprising calcium carbonate and/or white Portland cement. In some embodiments, the solid reversion pigment mixture consists essentially of synthetic iron oxide pigment and/or organic pigment, titanium dioxide, and calcium carbonate and/or white Portland cement. A liquid pigment mixture may comprise a pigment (i.e., synthetic iron oxide pigment and/or organic pigment), titanium dioxide, polycarboxylate surfactant, and water. In some embodiments, the liquid reversion pigment mixture consists essentially of synthetic iron oxide pigment and/or organic pigment, titanium dioxide, polycarboxylate surfactant, and water. Both these solid pigment mixtures and the liquid pigment mixtures can be used in the methods of this invention and in the systems and kits of this invention.

Other embodiments of this invention are to a solid pigment mixture and a liquid pigment mixture for changing uncured colored concrete to a gray-like or other acceptable color. Methods of using pigment mixtures to alter the colored concrete, to a different color, are also within this invention.

BRIEF DESCRIPTION OF THE DRAWING

The invention may be more completely understood in consideration of the following detailed description of various embodiments of the invention in connection with the accompanying drawing, in which.

DETAILED DESCRIPTION OF THE INVENTION

Figure 1A:
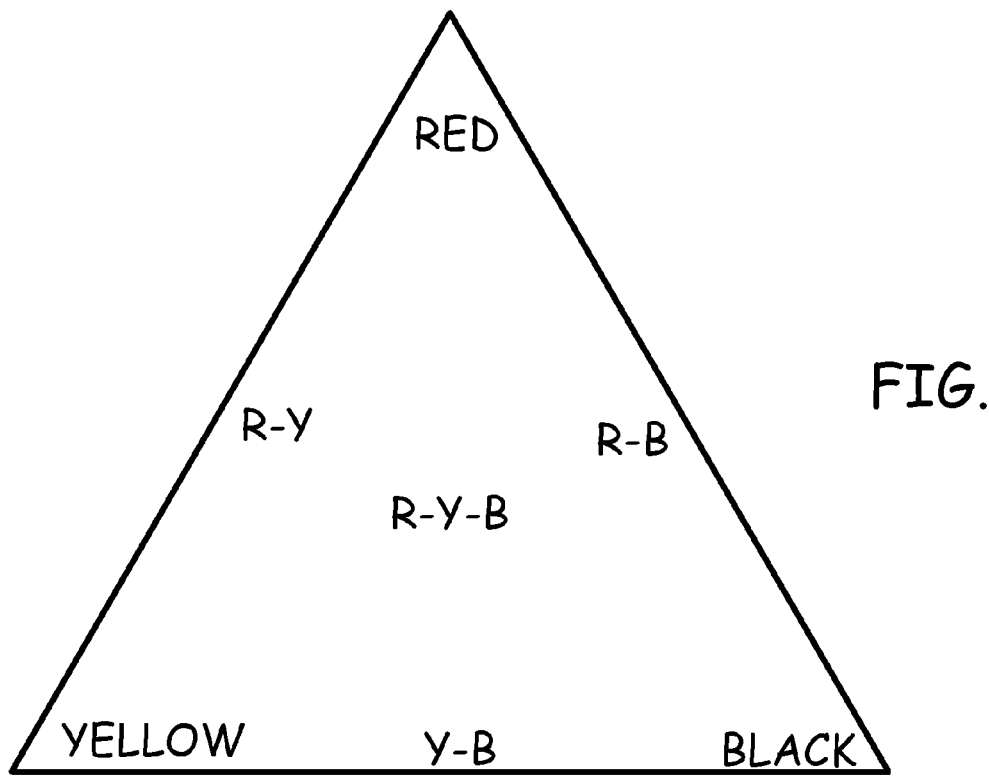
FIG. 1A is a diagram illustrating seven reversion pigment mixtures and their relationships.

The present disclosure provides methods for reverting uncured, previously colored concrete and other cementitious materials back to a gray color. In some embodiments, the previously colored material is changed to a color sufficiently close to the original gray color that the human eye, without optical enhancement or measuring devices, cannot observe a noticeable difference.

The system of the present invention provides an environmentally friendly alternative to removing uncured colored concrete residue from trucks and mixing vessels. The common mode for removing concrete residue is by rinsing the vessel with water and then disposing of the dirty water. Typically, anywhere from about 150 to 500 pounds of concrete residue remain in a typical ready-mixed concrete truck. Prior to using that truck again for a subsequent uncolored or differently colored concrete batch, the previously colored residue must be eliminated from the truck so that the subsequent batch does not result in an off-color. The residue is typically discarded, dumped on the ground, usually as a mixture of the bulky cement and about 300 to 2000 gallons of oxide-tainted rinse water. By changing the uncured concrete in the vessel (e.g., truck) back to gray, in one embodiment, the present invention reduces the amount of concrete, the amount of clean rinse water used, and the amount of dirty rinse water discarded. The savings are seen both in water used and in time. In another embodiment, the present invention eliminates the need to remove and discard the colored concrete. By avoiding the need to remove the colored concrete residue from the vessel, raw materials (e.g., cement, aggregate, water and other concrete ingredients) are extended and time, space in landfills, and the environment are preserved. Dumping of dirty rinse water can be avoided. In this embodiment, the colored concrete residue may be reverted back to gray or may be altered to a different color.

To revert the previously colored concrete product back to (or close to) its original gray color, Applicant has designed a system that utilizes a variety of pigment mixtures that together can revert virtually any uncured colored concrete back to gray. The number of reversion pigment mixtures is significantly less than the number of possible concrete colors that can be returned to gray. For example, by using the five common pigment colors (red, yellow, black, blue and green), each at a weight percent of 0 to 10 wt-%, at 0.01 wt-% increments, the possible number of pigment formulations is infinite, greater than a calculator can determine. The reversion pigment system of this invention can be used to revert this infinite number of colors back to gray. In some embodiments, no more than 10 pigment mixtures are needed to revert an infinite number of colors back to gray. In other embodiments, no more than 8 or 7 or even 6 reversion pigment mixtures are needed to revert millions or more colors back to gray. After adding and mixing the appropriate reversion pigment mixture to the previously colored concrete residue, the resulting concrete is sufficiently close to the original gray color that the human eye, without optical enhancement or measuring devices, cannot observe a noticeable difference. By adding the reversion pigment mixture directly to the uncured previously colored concrete residue, the colored concrete is reverted to gray, masking traces of the color, thus reducing wasting of concrete and water.

Broadly, each reversion pigment mixture includes pigment, a whitening agent such as titanium dioxide ($TiO_2$) or white Portland cement, and optionally dispersion aid. The pigment is at least one of a synthetic iron oxide material (i.e., yellow, red or black) or an organic pigment material (e.g., a phthalo blue material such as phthalocyanine blue or a yellow material). There are five base colors, red, yellow, black, green and blue; each reversion pigment mixture will have at least one of the five base colors. There may be more than one pigment for a color (for example, two different "red" iron oxide pigments may be called "red"); these multiple pigments are together referred to as a single color. In some embodiments, the green color is obtained by mixing blue and yellow.

For solid reversion pigment mixtures, i.e., where the pigment mixtures are in particulate or granular form, a dispersion aid such as calcium carbonate ($CaCO_3$), white Portland cement, or a mixture thereof may be included to facilitate dispersion of the reversion pigment mixture into the concrete. For liquid reversion pigment mixtures, i.e., aqueous mixtures, one suitable dispersion aid is aqueous surfactant, particularly, a polycarboxylate surfactant.

Figure 1B:
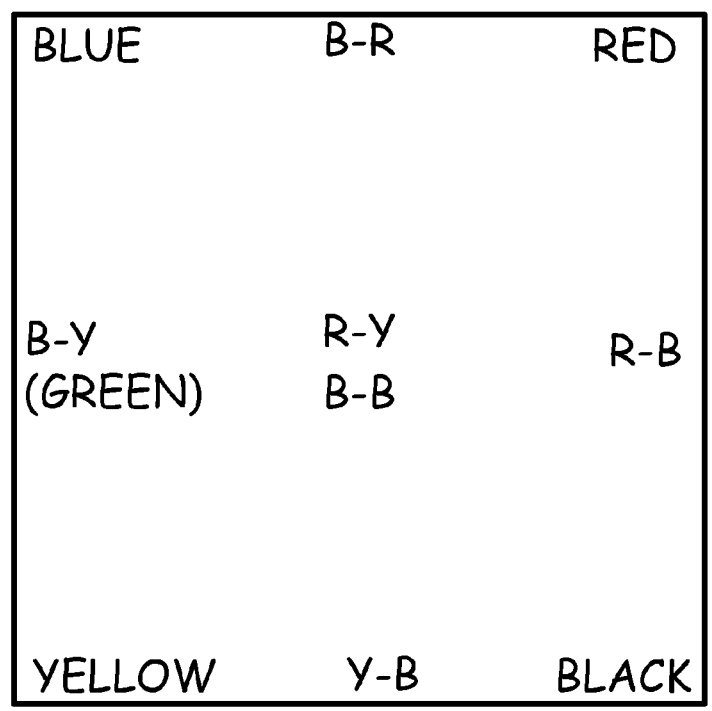
FIG. 1B is a diagram illustrating ten reversion pigment mixtures and their relationships.

FIGS. 1A and 1B are example diagrams illustrating how more colors of concrete can be reverted back to gray than the number of reversion pigment mixtures used. For example, in the diagram of FIG. 1A, seven reversion pigment mixtures exist. These seven reversion pigment mixtures are labeled "red", "yellow", "black", "r-y" (a combination of red and yellow), "r-b" (a combination of red and black), "y-b" (a combination of yellow and black), and "r-y-b" (a combination of red, yellow and black). These seven pigment mixtures can be used to revert at least 100 different colors of concrete, sometimes at least 1,000 different colors of concrete, back to or near to its original gray color. In this embodiment, the labels of the reversion pigment mixtures correlate to the color being reverted to gray. For example, a red concrete would use the "red" reversion pigment mixture to revert it to gray, a yellow concrete would used the "yellow" reversion pigment mixture, etc. A concrete colored with a combination of red and yellow pigments would be reverted with "r-y" pigment mixture, or, in some embodiments through not preferred, with "r-y" combined with "yellow" or with "r-y" combined with "red", depending on the original pigment formulation.

In FIG. 1B, ten reversion pigment mixtures exist. The ten reversion pigment mixtures are labeled "red", "yellow", "blue", "black", "r-b" (a combination of red and black), "y-b" (a combination of yellow and black), "b-r" (a combination of blue and red), "b-y" or "green" (a combination of blue and yellow), "b-b" (a combination of blue and black) and "r-y" (a combination of red and yellow). These ten pigment mixtures can be used to revert at least 200 different colors of concrete, sometimes at least 2,000 different colors of concrete, back to or near to its original gray color. In this embodiment, the labels of the reversion pigment mixtures correlate to the color being reverted to gray. These ten reversion pigment mixtures include the "blue" pigment mixture and mixtures that are combinations with "blue", for reverting blue, green and purple colors back to gray.

Figure 2A:
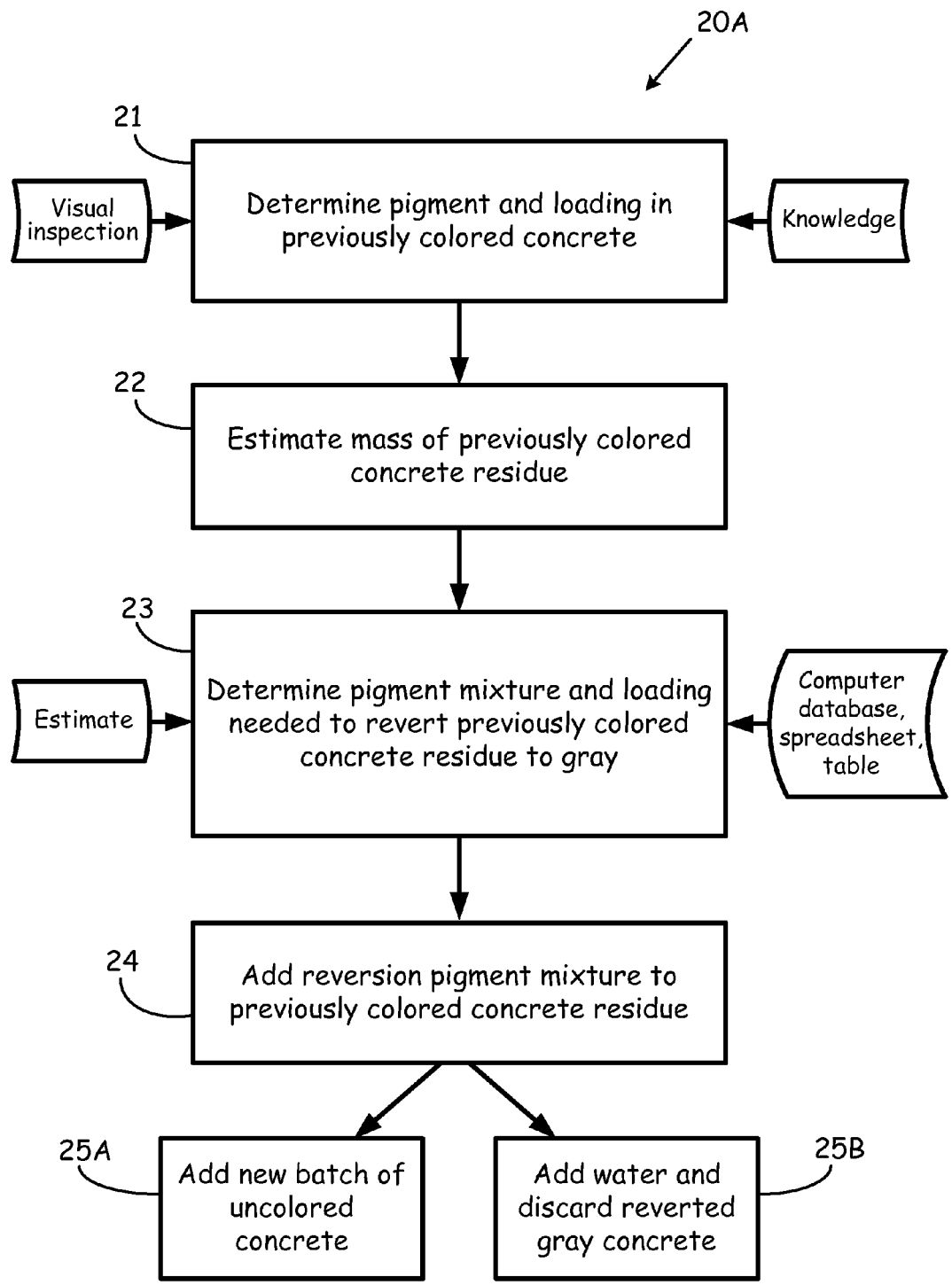
FIG. 2A is a step-wise method for reverting uncured, previously colored concrete to gray.

FIG. 2A is a flow diagram of an exemplary method for reverting an uncured, colored concrete back to gray color. It should be understood that process 20A of FIG. 2A is merely one suitable method for reverting colored concrete and that other alternate processes could be used that still fall within the invention of this disclosure. In Step 21, the pigment and its amount of loading in the previously colored concrete is determined; this may be done, for example, by visual inspection of the concrete or by knowing what pigment formula and loading was used to color the concrete. The pigment formula may be any of the thousands that are commercially available from suppliers, such as Davis Colors, Prism Pigments, Solomon, Lanxess, and Butterfield. The original pigment loading may be, for example, 1 wt-% pigment, 1.5 wt-%, 2 wt-%, 5 wt-%, etc., based on the cementitious portion of the concrete. Typically the pigment loading is no more than 10 wt-%. The mass or volume of the previously colored concrete is determined in Step 22. For standard ready-mixed trucks, the amount of residue is typically 150-200 pounds of concrete, although some trucks may have as much as 400-500 pounds of concrete. In some embodiments, the vessel (e.g., truck) may be dumped to reduce the amount remaining in the vessel. The amount of concrete residue may be determined or estimated prior to or simultaneously to determining the pigment loading.

In Step 23, the needed reversion pigment mixture and its amount are determined; this may be done, for example, by estimation, based on visual inspection of the colored concrete or by accessing an information storage source, such as a database. In many embodiments, the amount of reversion pigment mixture added is about five to six times (5×-6×) more than the original amount of pigment. For example, if the original pigment had a loading of 1 wt-% of the cementitious material, the reversion pigment mixture may be about 5 wt-% of the cementitious material. A level of 5× is typically the amount of reversion pigment needed for red-toned concrete, including red-yellow, red-black and red-blue combinations. For other pigment mixtures (e.g., yellow, black, blue, etc. with very little red) it may be sufficient to use a reversion pigment loading of about 2×-3× (e.g., about 2.5×). If utilizing an information storage source to select the reversion pigment mixture, the source will take into account the original pigment formula and the loading when indicating which reversion pigment mixture and amount to use.

The appropriate amount and type of reversion pigment mixture is added in Step 24 based on the determination from Step 23. For a ready-mixed truck, the reversion pigment mixture would be added directly into the mixing vessel. The reversion pigment mixture may be added as a solid material or as a liquid. In some embodiments, water may be added to facilitate the inclusion of the reversion pigment into the concrete. After addition of the reversion pigment mixture, the resulting concrete is gray. The gray may be sufficiently close to the original gray color of the concrete that the human eye, without optical enhancement or measuring devices, cannot observe a noticeable difference. In some embodiments, some virgin concrete is added to the reverted concrete, so that the resulting concrete is sufficiently close to the original gray color that the human eye, with or without optical enhancement or measuring devices, cannot determine a noticeable difference.

In some embodiments, as in Step 25A, a new batch of concrete is added into the vessel (e.g., the ready-mixed truck). There is no discernible evidence in this new batch of concrete of the previously colored concrete; that is, the batch of concrete is not off-color due to the previously colored residue that remained in the vessel. This batch of new concrete can be subsequently colored, or left as gray, as desired without being off-color.

Alternately in Step 25B, a small amount of water (e.g., generally less than about 100 gallons, or less than about 50, or less than about 20 gallons) is added to the vessel having the reverted concrete. This small amount of gray concrete slurry can be discarded. Any residue that remains in the vessel is sufficiently gray that any subsequent batch of new concrete will not be off-color.

Figure 2B:
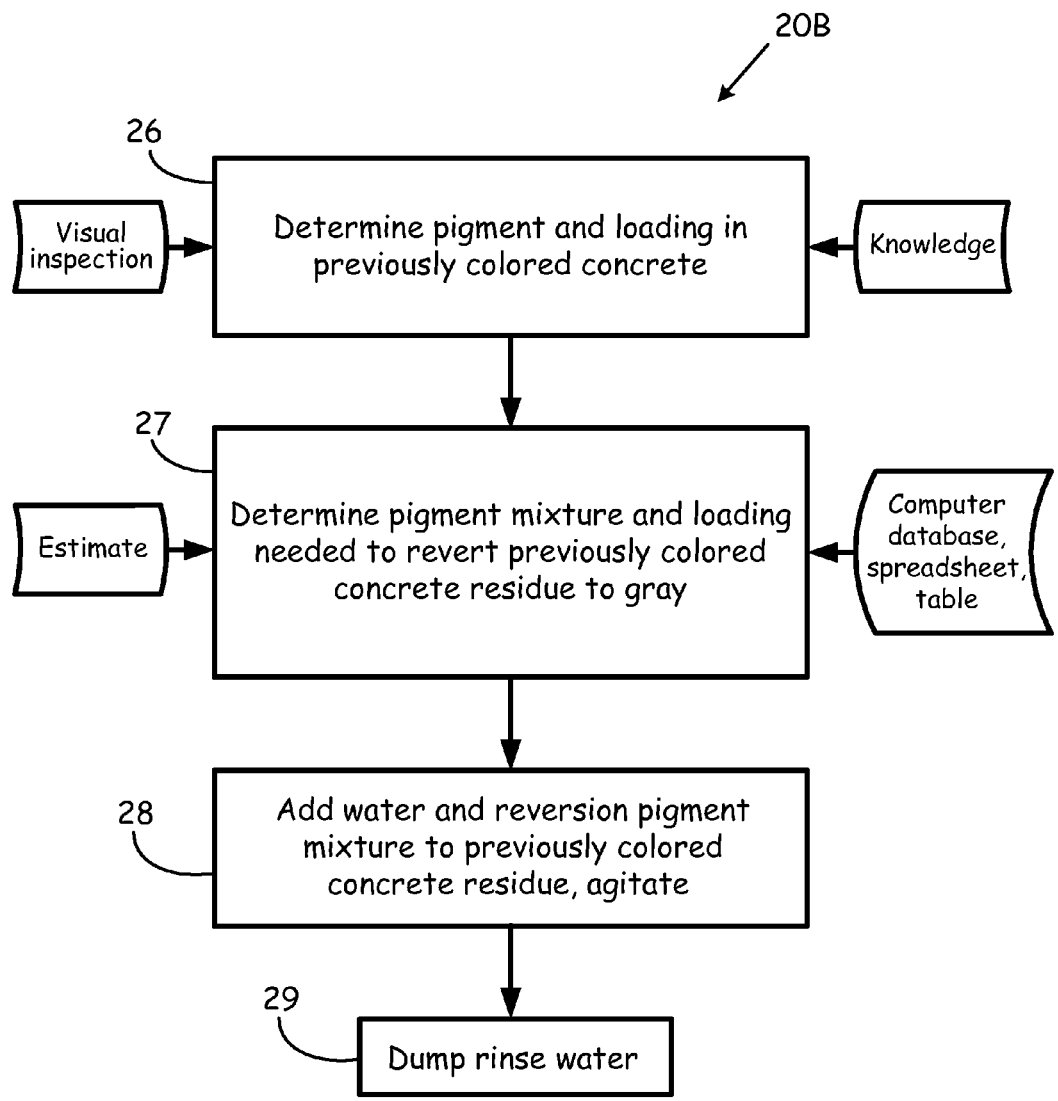
FIG. 2B is an alternate step-wise method for reverting uncured, previously colored concrete to gray.

FIG. 2B is a flow diagram of an alternate exemplary method for reverting an uncured, colored concrete back to gray color. It should be understood that process 20B of FIG. 2B is merely one suitable method for reverting colored concrete and that other alternate processes could be used that still fall within the invention of this disclosure. In process 20B, any large amounts of uncured colored concrete have been removed (e.g., dumped) from the vessel prior to reverting the color to gray. As in Step 21 of process 20A, in Step 26 of process 20B the pigment and its amount of loading in the previously colored concrete is determined, for example, by visual inspection of the concrete or by knowing what pigment formula and loading was used to color the concrete. In Step 27, the needed reversion pigment mixture and its amount are determined; this may be done, for example, by estimation, based on visual inspection of the colored concrete or by accessing an information storage source, such as a database.

Together with rinse water, the appropriate amount and type of reversion pigment mixture is added in Step 28 based on the determination from Step 27. The amount of water added is no more than about 100 gallons, in some embodiments no more than about 50 or 20 gallons, and in other embodiments, no more than about 10 gallons. After agitating the vessel with the reversion pigment mixture and the rinse water therein, the resulting concrete residue and water is gray. The residue and gray rinse water is dumped in Step 29.

To accurately determine the reversion pigment mixture and its amount needed (Step 23 or Step 27), an accessible information storage source may be used. Examples of such storage sources include a spreadsheet, computer program, and database, although in some embodiments, the information storage source may be or may be referred to as an appendix, catalogue, chart, index, register, canon, archive, docket, legend, guide, formula, table or tabulation, portfolio, system, list, anthology, map, plan, scheme, graph, compendium, directory, handbook, manual, blueprint, theorem, cipher or key.

Pigments for coloring concrete and other cementitious materials are available from only a few commercial suppliers of these pigments (e.g., Davis Colors, Prism Pigments, Solomon, Lanxess, Butterfield, etc.); these suppliers can be readily found in concrete journals and publications and via the Internet. The ingredients and loadings of these readily available pigments may be recorded in the information storage source. By knowing the initial pigment formula used to color the concrete residue in the vessel, the appropriate reversion pigment mixture can be selected.

As indicated above and throughout this disclosure, significantly more concrete colors can be reverted to gray than the number of reversion pigment mixtures, in some embodiments, the number of colors that can be reverted is at least 10× more than the number of reversion pigment mixtures, often at least 20× more, and even at least 50× more. It has been found that in some embodiments, a simple rule of thumb can be used to determine which reversion pigment mixture to use. By merely knowing the relative percentages of pigment (e.g., red, yellow, black and/or blue pigment) in the original pigment used to color the concrete, a reversion pigment mixture can readily be selected.

Figure 3:
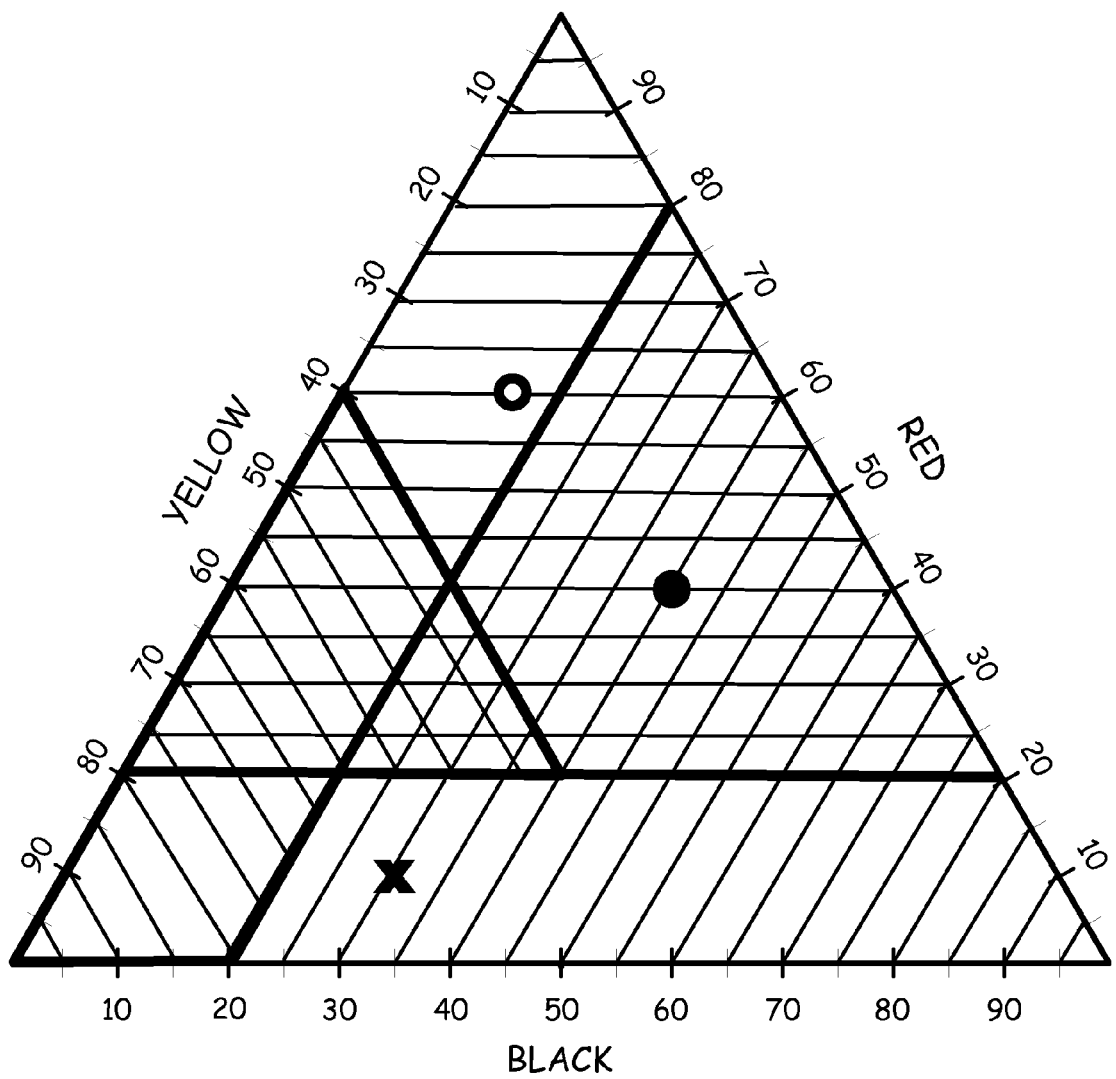
FIG. 3 is a three-axis graph for three possible original pigments, the graph including thresholds for the three pigments.

FIG. 3 illustrates one example of a three-axis graph showing the thresholds for three pigments, red, yellow and black (the red pigment may be either a blue-based red, an orange-based red, or a combination of the two reds). The majority of concrete coloring pigments utilize various combinations of red, yellow and black pigments; concrete pigments having blue are a special order and are not common. Returning to the example of FIG. 3, it was found that any pigment formula having at least 20 wt-% red pigment would need a "red" reversion pigment mixture, any pigment formula having at least 20 wt-% black pigment would need a "black" reversion pigment mixture, and a pigment formula having at least 40 wt-% yellow pigment would need a "yellow" reversion pigment mixture (as will be explained below, this threshold for yellow is not required for all pigment formulas that have at least 40 wt-% yellow). FIG. 3 identifies these three thresholds; the three axis are identified on the graph as horizontal stripes for "red", right to left downward stripes for "black", and left to right downward stripes for "yellow"; these stripes are also an approximation of the grid correlating to the appropriate axis.

Where a pigment formula is one that has individual colors above multiple thresholds, a combination of pigments is used for the reversion pigment mixture. For example, an original pigment formula having 40 wt-% red, 40 wt-% black and 20 wt-% yellow pigments (marked as a solid dot in FIG. 3) falls in the intersecting area of "red" and "black", indicating that a reversion pigment mixture having both "red" and "black"

pigments should be used (e.g., "red" and "black" from FIG. 1A or "r-b" from FIG. 1A). As another example, an original pigment formula having 60 wt-% red, 15 wt-% black and 25 wt-% yellow pigments (marked as an open dot in FIG. 3) falls only in "red" indicating that a "red" reversion pigment mixture should be used (e.g., "red" from FIG. 1A).

The exact thresholds for each of the colors will depend on the formulations of the reversion pigment mixtures. In many embodiments, red pigment has a threshold within the range about 15-25 wt-%, black pigment has a threshold within the range about 15-30 wt-%, and yellow pigment has a threshold within the range about 20-50 wt-%. The thresholds will depend on various features, such as the specific pigments used (e.g., particle size, porosity, supplier, etc.), the exact reversion pigment mixture formulations, and the number of reversion pigment mixture formulations. Returning to FIG. 3, an alternate three-axis graph could have thresholds for the pigments of, for example, 17 wt-% red, 17 wt-% black, and 40 wt-% yellow. Another example of thresholds is 19 wt-% for red, 19 wt-% for black, and 34 wt-% for yellow. Depending on the exact reversion pigment mixture formulations, these thresholds may have a tolerance of about 1-2 wt-%. In many embodiments, the exact threshold values will not be readily available to the public (e.g., the concrete mixing personnel) but instead will be incorporated into the spreadsheet, table, computer program or other information storage source.

Both the "red" and "black" reversion pigments, in the example illustrated in FIG. 3, follow the straightforward rule that any mixture having at least that threshold level of pigment will need that reversion pigment mixture. For both "red" and "black", the area encompassed is triangular. For the "yellow" reversion pigment, however, not all levels above the threshold will need that reversion pigment mixture, but rather, the area encompassed by the "yellow" is irregular. Another example in FIG. 3, an original pigment formula having 10 wt-% red pigment, 30 wt-% black pigment and 60 wt-% yellow pigment (marked as an "X" in FIG. 3) falls in "black" in the area void of "yellow", indicating that a "black" reversion pigment mixture should be used (e.g., "black" from FIG. 1A).

As indicated above, the threshold for yellow is not required for all pigment formulas that have at least 40 wt-% yellow. Because black is such a strong color, "yellow" is not able to provide sufficient coloring to be useful; this has been found for mixtures having a level of 20 wt-% or more of black, no matter how much yellow or red is present. In some embodiments, a "yellow-black" reversion pigment mixture adds little to a collection of reversion pigment mixtures and is not needed. In one particular embodiment, a collection of six reversion pigment mixtures is sufficient to revert back to gray hundreds to thousands of pigment possibilities; these six are "red", "yellow", "black", "red-yellow", "red-black" and "red-yellow-black". Again, depending on the specific reversion pigment mixtures, although a "yellow-black" mixture is not useful, a "red-yellow-black" mixture is beneficial. In some embodiments however, the "red-yellow-black" reversion pigment mixture may be eliminated, again, depending on the specific formulations.

A similar four-axis graph may be designed for original pigment formulas having four pigments (e.g., red, black, yellow, and blue or green) or a similar five-axis graph may be designed for original pigment formulas having five pigments (e.g., red, black, yellow, blue, and green).

The reversion pigment mixture may be packaged in handy, easy-to-use containers, specifically engineered for the vessel having the colored concrete residue. For example, because a typical ready-mixed concrete truck may have a residue of 100-500 pounds concrete, the reversion pigment mixtures can be specifically designed to provide the exact reversion pigment amounts for 100-500 pounds of concrete residue. The amount of reversion pigment needed could be determined by the same information storage source that identifies the reversion pigment mixture to use. For convenience of use, the reversion pigment mixtures are packaged in containers that are integers, and multiples of that integer, for example, 5 pounds, 10 pounds, etc. or 1 liters, 2 liters, etc. In some embodiments, integer half units may also be used. For solid pigment mixtures, the containers may be paper or cellulose-based bags or containers, or may be polymeric bags or containers that dissolve or solubilize upon exposure to alkaline liquid.

Figure 4A:
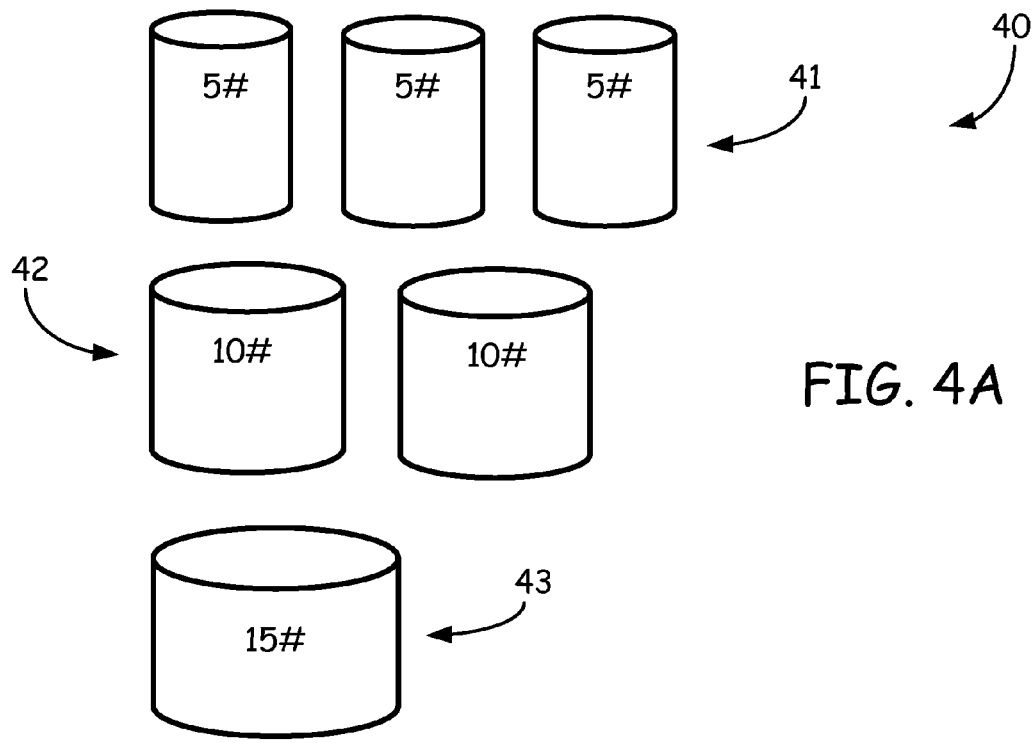
FIG. 4A is a schematic view of a kit for reverting uncured, previously colored concrete to gray, the kit having various sizes of pigment mixtures.

FIG. 4A illustrates a first example of a kit of solid pigment mixtures for reverting previously colored concrete to gray. Kit 40 of FIG. 4A has six containers of reversion pigment mixture, a first set 41 composed of three 5 pound containers, a second set 42 composed of two 10 pound containers, and a third set 43 composed of a single 15 pound container. Each of the containers of sets 41, 42, 43 has the same reversion pigment mixture (e.g., "red"). Together, kit 40 has 50 pounds of reversion pigment mixture that can be added to the vessel in various combinations (for example, 20 pounds can be obtained by, e.g., two 10 pound containers or by one 15 pound container and one 5 pound container). In this illustrated kit 40, set 42 has a weight 2× the weight of set 41, and set 43 has a weight 3× the weight of set 41. In other embodiments, set 42 may have a weight 1.5× the weight of set 41, and set 43 may have a weight 3× the weight of set 41. In yet other embodiments, set 42 may have a weight 2× the weight of set 41, and set 43 may have a weight 4× the weight of set 41. The same applies for volume of the reversion pigment mixtures.

Figure 4B:
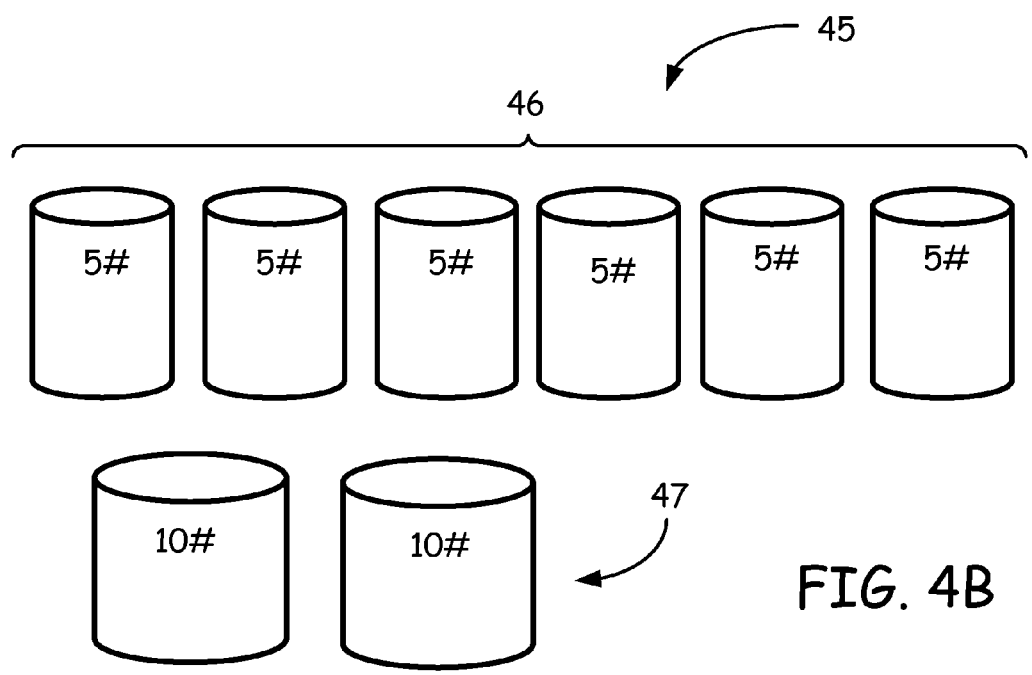
FIG. 4B is an alternate kit having various sizes of pigment mixtures.

FIG. 4B illustrates a second example of a kit of pigment mixtures for reverting previously colored concrete to gray. Kit 45 of FIG. 4B has eight containers of solid reversion pigment mixture, a first set 46 composed of six 5 pound containers and a second set 47 composed of two 10 pound containers. Each of the containers of sets 46, 47 has the same reversion pigment mixture. Together, kit 45 has 50 pounds of reversion pigment mixture that can be added to the vessel in various combinations. In another embodiment, a kit may have a first set composed of 6 pound containers and a second set of 24 pound containers. The accessible information source will advise both the reversion pigment mixture and the amount to be added to revert the original color back to gray. In one embodiment, a ready-mixed truck having 100-200 pounds of colored concrete residue will use either 5, 10, 15 or 20 pounds of reversion pigment mixture. In another embodiment, a ready-mixed truck having 100-200 pounds of colored concrete residue will use either 6, 12, 18 or 24 pounds of reversion pigment mixture.

Figure 5:
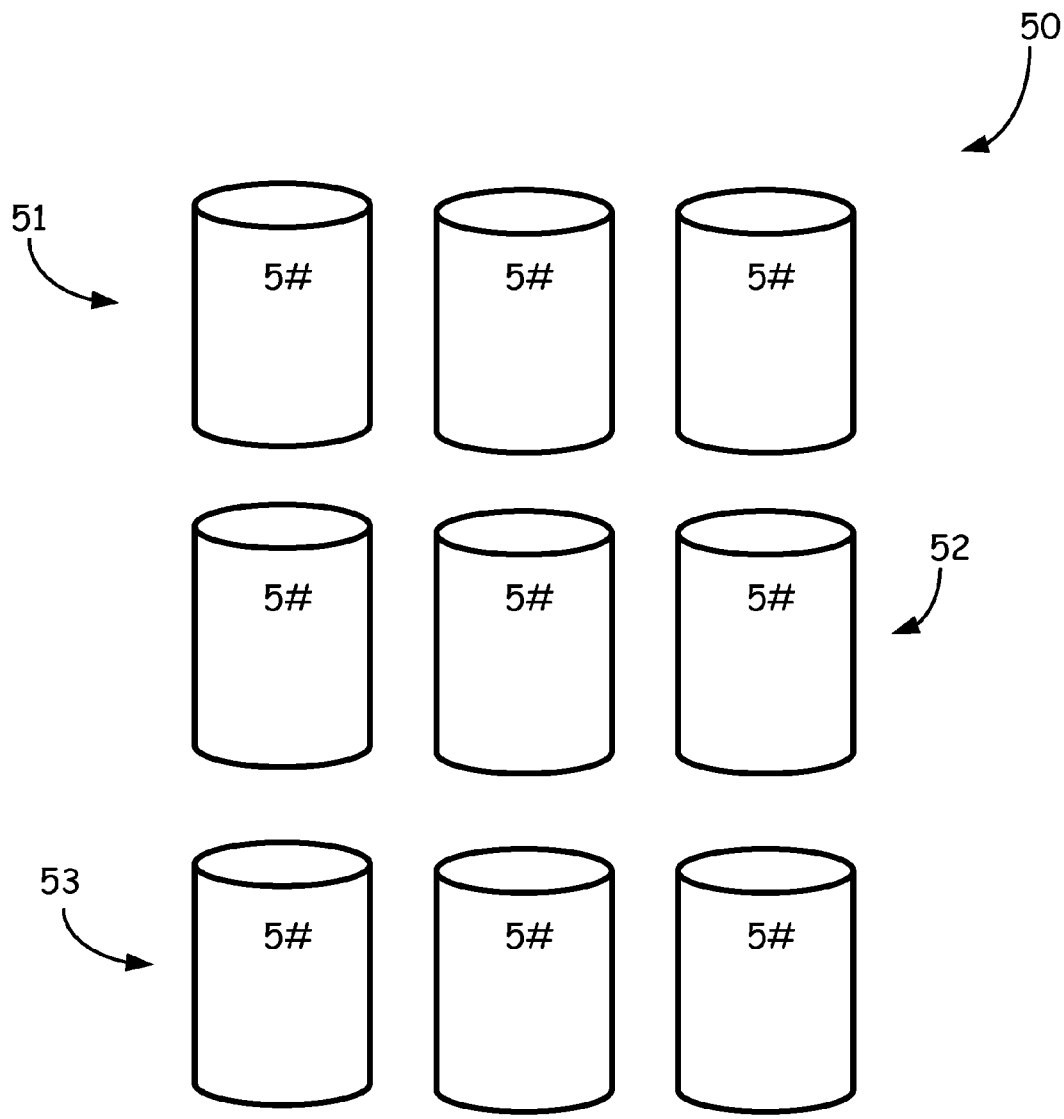
FIG. 5 is a schematic view of an alternate kit for reverting uncured, previously colored concrete to gray, the kit having various pigment mixtures.

FIG. 5 illustrates another example of a possible kit of solid reversion pigment mixtures. Kit 50 of FIG. 5 has nine containers of reversion pigment mixture, a first set 51 composed of three 5 pound containers of a first reversion pigment mixture (e.g., "red"), a second set 52 composed of three 5 pound containers of a second reversion pigment mixture (e.g., "yellow"), and a third set 53 composed of three 5 pound containers of a third reversion pigment mixture (e.g., "black"). Together, kit 50 has 45 pounds of reversion pigment mixture that can be added to the vessel in various combinations (for example, 5 pounds of "red" and 5 pounds of "yellow").

Both solid and liquid reversion pigment mixtures may be packaged in containers that dissolve or solubilize upon exposure to alkaline liquid. In other embodiments, liquid reversion pigment mixtures may be held in bulk tanks operably connected to liquid measuring equipment, so that the proper amount of pigment mixture can be squirted directly into the concrete vessel (e.g., ready-mixed truck) as needed. Each reversion pigment mixture may have its own tank or each reversion pigment mixture may be mixed on demand.

As indicated above, a system for reverting colored concrete back to gray may have numerous reversion pigment mixtures (e.g., 10 mixtures, 8 mixtures, 6 mixtures, etc.) that are formed from a combination of three pigments (e.g., yellow, black, blue) or four pigments (i.e., red, yellow, black, blue). Depending on the specific reversion pigment mixtures and the number of reversion pigment mixtures, virtually any colored concrete residue can be reverted back to gray. As indicated above, the reversion pigment mixtures may be solid or may be liquid and each reversion pigment mixture includes pigment, a whitening agent (e.g., titanium dioxide ($TiO_2$)), and preferably, yet optionally, dispersion aid.

The level of pigment in the reversion pigment mixture is no more than about 50 wt-%, for both solid pigment mixtures and liquid pigment mixtures. In some embodiments, the level of pigment is no more than about 25 wt-%. Similarly, the level of whitening agent is no more than about 50 wt-% for both solid and liquid pigment mixtures, in some embodiments, no more than about 25 wt-%.

Solid reversion pigment mixtures usually have no more than 30 wt-% pigment (in some embodiments no more than 20 wt-%) and no more than 25 wt-% whitening agent, such as $TiO_2$ or white Portland cement. For solid mixtures, dispersion aid facilitates the dispersion of the reversion pigment mixture in the concrete. Additionally, dispersion aid may be added to a pigment mixture as a filler to completely fill a specific sized container. Examples of suitable dispersion aids include white Portland cement, calcium carbonate ($CaCO_3$), silica, silica fume and fumed silica. Any dispersion aid if present, is at least 20 wt-% of the mixture, in some embodiments at least 30 wt-%. In some reversion pigment mixtures, the dispersion aid is at least 45 wt-%, even at least 50 wt-%. For some reversion pigment mixtures, white Portland cement is a preferred ingredient, as it facilitates incorporation of the pigment into the previously colored concrete and provides a degree of whitening to the concrete.

Liquid reversion pigment mixtures generally have a similar amount of pigment and whitening agent as solid mixtures. Typically, liquid reversion pigment mixtures do not include white Portland cement but may have calcium carbonate or other physical dispersion aid. In some embodiments, a chemical dispersion aid, such as a surfactant or a soap may be included; 0.5-3 wt-% polycarboxylate surfactant, added to the liquid carrier, is a preferred chemical dispersion aid. Water is the preferred liquid carrier. Together, these ingredients will form a liquid mixture with about 30-50% solids, often about 40% solids. Typically, the pigment and any $TiO_2$ and $CaCO_3$ material will not solubilize in the liquid carrier.

By providing a plurality of reversion pigment mixtures (e.g., "red", "yellow", "black", etc.) and by knowing the pigment and loading used for the colored concrete, its residue can be readily reverted to gray. By having a gray concrete residue rather than a colored concrete residue, the gray concrete residue can be rinsed from the vessel with significantly less rinse water than needed to rinse colored residue from the vessel, and having gray residue in the vessel allows a subsequent batch of new (gray) concrete to be loaded into the same, unrinsed vessel.

EXAMPLES

The following non-limiting examples will further illustrate the invention. All weights in the examples are given in grams, unless otherwise noted.

In these examples, the following materials were used: "yellow pigment"—a synthetic yellow iron oxide 311; "blue pigment"—a blue powder pigment available from Sun Chemical under the trade designation "Sunfast Blue 15-3"; "black pigment"—a synthetic black iron oxide 740; white Portland cement; and calcium carbonate. The various ingredients were mixed together to form a homogenous mixture. At least for those examples including both yellow pigment and blue pigment, a Cowles-style high speed disperser was used to obtain homogeneity.

Tables 1 through 7 provide two collections (kits) of solid pigment mixtures that can be used to revert colored concrete to gray. The labels of the reversion pigment mixtures correlate to the color being reverted back to gray. A kit having these reversion pigment mixtures, when the specific reversion pigment mixture is properly selected at the proper amount, can revert virtually any colored concrete to gray, in some embodiments, virtually back to the original gray color. In some embodiments, the reversion pigment mixtures of Tables 1 through 6 (i.e., eliminating the "red-yellow-black" pigment mixture) are sufficient to revert virtually any colored concrete back to gray.

TABLE 1

"Red" reversion pigment mixture

| | Kit 1 | Kit 2 |
|---|---|---|
| Yellow pigment | 4.082 | 3.062 |
| Blue pigment | 3.062 | 2.300 |
| TiO2 | 17.236 | 14.968 |
| White Portland cement | 10.433 | 10.433 |
| CaCO3 | — | 37.648 |

TABLE 2

"Yellow" reversion pigment mixture

| | Kit 1 | Kit 2 |
|---|---|---|
| Black pigment | 12.247 | 12.247 |
| TiO2 | 45.813 | 40.370 |
| White Portland cement | 21.319 | 21.319 |
| CaCO3 | 3.629 | 3.629 |

TABLE 3

"Black" reversion pigment mixture

| | Kit 1 | Kit 2 |
|---|---|---|
| Yellow pigment | 3.470 | 3.470 |
| TiO2 | 45.813 | 40.370 |
| White Portland cement | 17.236 | 17.236 |
| CaCO3 | 17.236 | 17.236 |

TABLE 4

"Red-Yellow" reversion pigment mixture

| | Kit 1 | Kit 2 |
|---|---|---|
| Yellow pigment | 2.041 | 1.531 |
| Blue pigment | 1.701 | 1.272 |
| Black pigment | 6.350 | 6.350 |
| TiO2 | 31.298 | 27.669 |
| White Portland cement | 14.969 | 14.969 |
| CaCO3 | 23.133 | 23.133 |

TABLE 5

"Red-Black" reversion pigment mixture

|  | Kit 1 | Kit 2 |
| --- | --- | --- |
| Yellow pigment | 4.762 | 3.803 |
| Blue pigment | 1.701 | 1.272 |
| TiO2 | 31.751 | 27.669 |
| White Portland cement | 13.154 | 13.154 |
| CaCO3 | — | 29.030 |

TABLE 6

"Yellow-Black" reversion pigment mixture

|  | Kit 1 | Kit 2 |
| --- | --- | --- |
| Yellow pigment | 2.72 | 2.72 |
| Black pigment | 6.123 | 6.123 |
| TiO2 | 45.813 | 45.813 |
| White Portland cement | 19.504 | 19.504 |
| CaCO3 | 9.979 | 9.979 |

TABLE 7

"Red-Yellow-Black" reversion pigment mixture

|  | Kit 1 | Kit 2 |
| --- | --- | --- |
| Yellow pigment | 2.725 | 2.385 |
| Blue pigment | 1.021 | 0.769 |
| Black pigment | 4.082 | 4.082 |
| TiO2 | 36.287 | 31.751 |
| White Portland cement | 15.422 | 15.422 |
| CaCO3 | 21.772 | 21.772 |

Kit 1, having the seven reversion pigment mixtures described above, has a red threshold of 19 wt-% red pigment present in the original pigment formula used to color concrete that is subsequently being reverted to gray, a black threshold of 19 wt-%, and a yellow threshold of 34 wt-%.

An example of a solid "green" reversion pigment mixture, one that can be used to revert green-based colored concrete back to gray color, has 1.270 g $TiO_2$ and 0.364 g red pigment (synthetic iron oxide), with the remainder white Portland cement, depending on the size of container to be filled. An example of a "blue" reversion pigment mixture, one that can be used for blue-based concrete, has yellow pigment, $TiO_2$ and white Portland cement and/or $CaCO_3$.

With these reversion pigment mixtures, by knowing the original concrete pigment formulation and loading (e.g., from an information storage source or by visual inspection), it is no longer necessary to discard colored concrete residue and its rinse water, as the colored concrete can be readily reverted to gray and used in the next concrete batch. Alternately, the colored concrete can be reverted to gray and the vessel rinsed with significantly less rinse water prior to adding the next concrete load.

Use of the reversion pigment mixtures eliminates the need to dispose concrete or rinse water. If it is desired to dispose the concrete and rinse water, less rinse water is needed than if no reversion pigment mixture were used.

By reverting uncured, colored concrete back to gray by the use of reversion pigment mixtures in accordance with the invention, the amount of concrete, the amount of clean rinse water used, and the amount of dirty rinse water discarded is being decreased. Similarly, by changing uncured, colored concrete to a different color by the use of pigment mixtures in accordance with the invention, discarding concrete, the use of clean rinse water, and discarding dirty rinse water can be eliminated.

Thus, embodiments of REVERTING COLORED CONCRETE AND RINSE WATER TO GRAY are disclosed. Various modifications and alterations of this invention will become apparent to those skilled in the art without departing from the scope and spirit of this invention, and it should be understood that this invention is not to be unduly limited to the illustrative embodiments set forth herein. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method for reverting uncured colored concrete in a vessel to gray, the colored concrete comprising gray concrete and a pigment formulation at a loading, the method comprising:
   determining an amount of red pigment, an amount of black pigment, an amount of yellow pigment, and an amount of green pigment in the pigment formulation; and
   adding a reversion pigment mixture to the colored concrete in the vessel, the reversion pigment mixture based on the amount of red pigment, the amount of black pigment, the amount of yellow pigment, and the amount of green pigment, wherein the reversion pigment mixture is at least one of the following:
   (1) if the amount of red pigment is greater than 15 wt-% of the pigment formulation, then selecting the reversion pigment mixture to revert red to gray,
   (2) if the amount of black pigment is greater than 15 wt-% of the pigment formulation, then selecting the reversion pigment mixture to revert black to gray,
   (3) if the amount of yellow pigment is greater than 20 wt-% of the pigment formulation, then selecting the reversion pigment mixture to revert yellow to gray, and
   (4) if the amount of green pigment is greater than 10 wt-% of the pigment formulation, then selecting the reversion pigment mixture to revert green to gray.

2. The method of claim 1 wherein determining the amount of red pigment, the amount of black pigment, the amount of yellow pigment, and the amount of green pigment comprises accessing a database.

3. The method of claim 1 wherein determining the amount of red pigment, the amount of black pigment, the amount of yellow pigment, and the amount of green pigment comprises visually evaluating the colored concrete and estimating the pigment formulation.

4. The method of claim 1 wherein:
   (1) if the amount of the red pigment is greater than 17 wt-% of the pigment formulation, then selecting the reversion pigment mixture to revert red to gray;
   (2) if the amount of the black pigment is greater than 17 wt-% of the pigment formulation, then selecting the reversion pigment mixture to revert black to gray;
   (3) if the amount of the yellow pigment is greater than 30 wt-% of the pigment formulation, then selecting the reversion pigment mixture to revert yellow to gray; and
   (4) if the amount of the green pigment is greater than 12 wt-% of the pigment formulation, the selecting the reversion pigment mixture to revert green to gray.

5. The method of claim 1 wherein the reversion pigment mixture comprises synthetic iron oxide pigment and/or organic pigment, titanium dioxide, and calcium carbonate and/or white Portland cement.

6. The method of claim 1 further comprising, after adding a reversion pigment mixture to the colored concrete, rinsing the vessel.

7. The method of claim 6 further comprising, after rinsing the vessel, adding a new concrete batch to the vessel.

8. The method of claim 1 further comprising, after adding a reversion pigment mixture to the colored concrete, adding a new concrete batch to the vessel.

9. A method for reverting uncured colored concrete in a vessel to gray, the method comprising:
   determining an amount of red pigment, an amount of black pigment, an amount of yellow pigment, and an amount of green pigment in a pigment formulation in an uncured colored concrete;
   adding water to the colored concrete in the vessel;
   adding a reversion pigment mixture to the colored concrete in the vessel, the reversion pigment mixture based on the amount of red pigment, the amount of black pigment, the amount of yellow pigment, and the amount of green pigment, wherein the reversion pigment mixture is at least one of the following:
   (1) if the amount of red pigment is greater than 15 wt-% of the pigment formulation, then selecting the reversion pigment mixture to revert red to gray,
   (2) if the amount of black pigment is greater than 15 wt-% of the pigment formulation, then selecting the reversion pigment mixture to revert black to gray,
   (3) if the amount of yellow pigment is greater than 20 wt-% of the pigment formulation, then selecting the reversion pigment mixture to revert yellow to gray, and
   (4) if the amount of green pigment is greater than 10 wt-% of the pigment formulation, then selecting the reversion pigment mixture to revert green to gray;
   and after adding the reversion pigment mixture and the water in the vessel, dumping gray rinse water from the vessel.

10. The method of claim 9 wherein determining the amount of red pigment, the amount of black pigment, the amount of yellow pigment, the amount of green pigment comprises accessing a database.

11. The method of claim 9 wherein determining the amount of red pigment, the amount of black pigment, the amount of yellow pigment, the amount of green pigment comprises visually evaluating the colored concrete and estimating the pigment formulation.

12. A method for reducing concrete rinse water, the method comprising:
   determining a pigment formulation and loading in an uncured colored concrete in a ready-mixed concrete truck, the pigment formulation having an amount of red pigment, an amount of black pigment, an amount of yellow pigment, and an amount of green pigment;
   adding no more than about 100 gallons of rinse water to the truck;
   after adding the rinse water in the truck, adding a reversion pigment mixture to the colored concrete in the truck; and
   after adding the reversion pigment mixture in the truck, dumping gray rinse water from the truck.

13. The method of claim 12 comprising adding no more than about 50 gallons of rinse water in the truck.

14. The method of claim 12 further comprising, after adding the reversion pigment, mixing the uncured colored concrete, the rinse water and the reversion pigment mixture for about 5 minutes.

15. The method of claim 9 wherein the reversion pigment mixture is added to the truck after the water is added to the truck.

* * * * *